US012579381B1

(12) United States Patent
    Jeschke

(10) Patent No.:  US 12,579,381 B1
(45) Date of Patent:      Mar. 17, 2026

(54) AUTOMATED ANALYSIS OF COMPUTER-DETECTED EVENT ACTIVITY TO IMPROVE RELATED TASK PERFORMANCE

(71) Applicant: OfficeAutomata, Inc., Seattle, WA (US)

(72) Inventor: Jeremiah F. Jeschke, Seattle, WA (US)

(73) Assignee: OfficeAutomata, Inc., Seattle, WA (US)

( * ) Notice:   Subject to any disclaimer, the term of this patent is extended or adjusted under 35 U.S.C. 154(b) by 150 days.

(21) Appl. No.: 18/596,563

(22) Filed:    Mar. 5, 2024

Related U.S. Application Data

(60) Provisional application No. 63/450,596, filed on Mar. 7, 2023.

(51) Int. Cl.
    *G06F 40/40*      (2020.01)
    *G06Q 10/0639*    (2023.01)
(52) U.S. Cl.
    CPC ....... *G06F 40/40* (2020.01); *G06Q 10/06398* (2013.01)

(58) Field of Classification Search
    None
    See application file for complete search history.

(56)             References Cited

U.S. PATENT DOCUMENTS 12,058,157  B1 *  8/2024   Colon ................. H04L 63/1425
    2017/0013003  A1 *  1/2017   Samuni ................... G06F 11/00
    2017/0317949  A1 *  11/2017   Aharonov ............. H04L 67/562
    2023/0244989  A1 *  8/2023   Riva ...................... G06N 20/00
                                                    706/11

* cited by examiner

*Primary Examiner* — Nafiz E Hoque
(74) *Attorney, Agent, or Firm* — VLP Law Group LLP; James A. D. White

(57)               ABSTRACT

Techniques are described for performing automated operations that include analyzing computer-detected event activity to improve further computer processing, such as to determine tasks performed that cause the events, to use natural language processing (NLP) to generate textual descriptions of the tasks, and to use the generated descriptions to improve further processing related to the tasks.

5 Claims, 9 Drawing Sheets

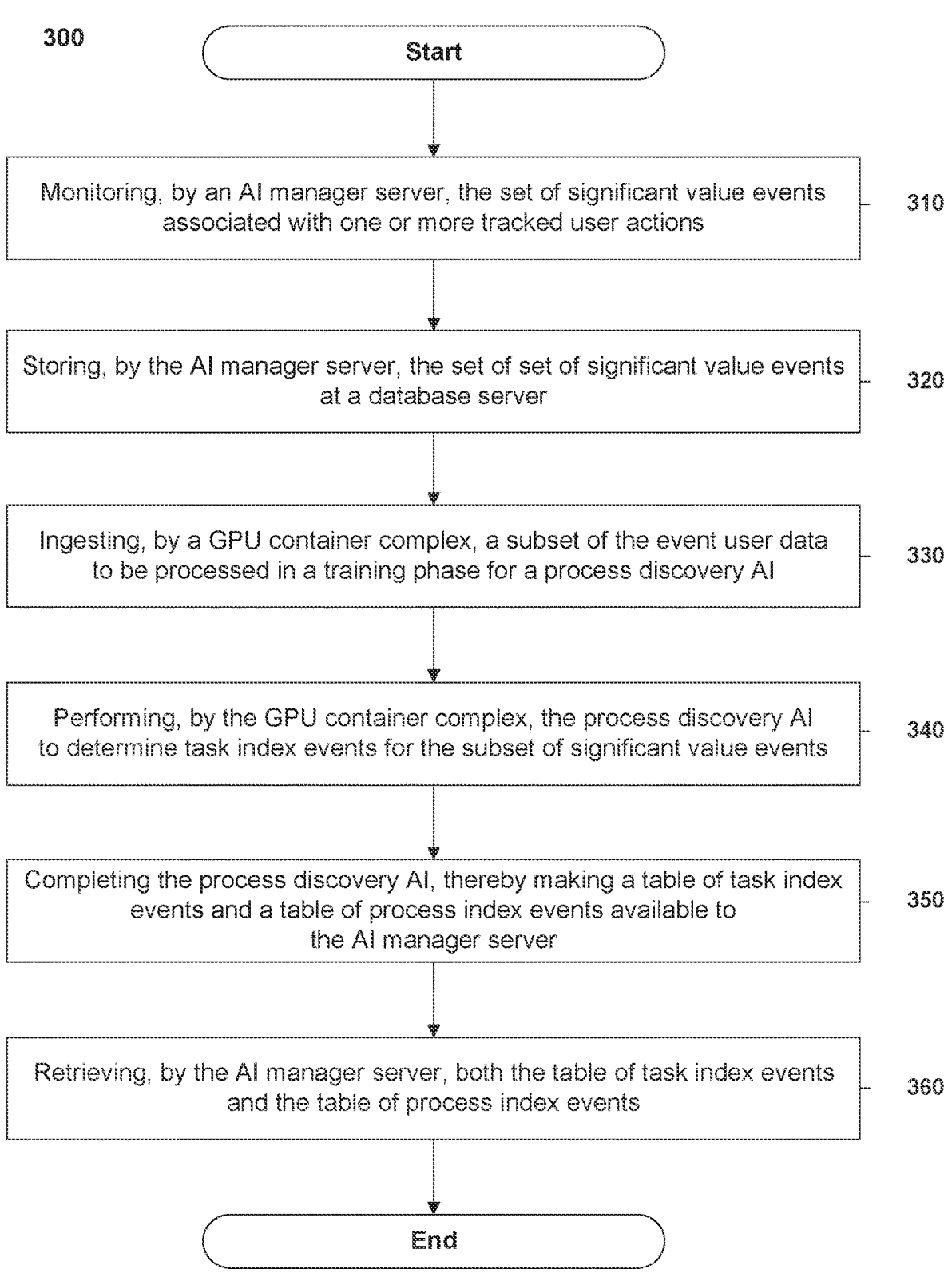

300

Start

Monitoring, by an AI manager server, the set of significant value events associated with one or more tracked user actions — 310

Storing, by the AI manager server, the set of set of significant value events at a database server — 320

Ingesting, by a GPU container complex, a subset of the event user data to be processed in a training phase for a process discovery AI — 330

Performing, by the GPU container complex, the process discovery AI to determine task index events for the subset of significant value events — 340

Completing the process discovery AI, thereby making a table of task index events and a table of process index events available to the AI manager server — 350

Retrieving, by the AI manager server, both the table of task index events and the table of process index events — 360

End

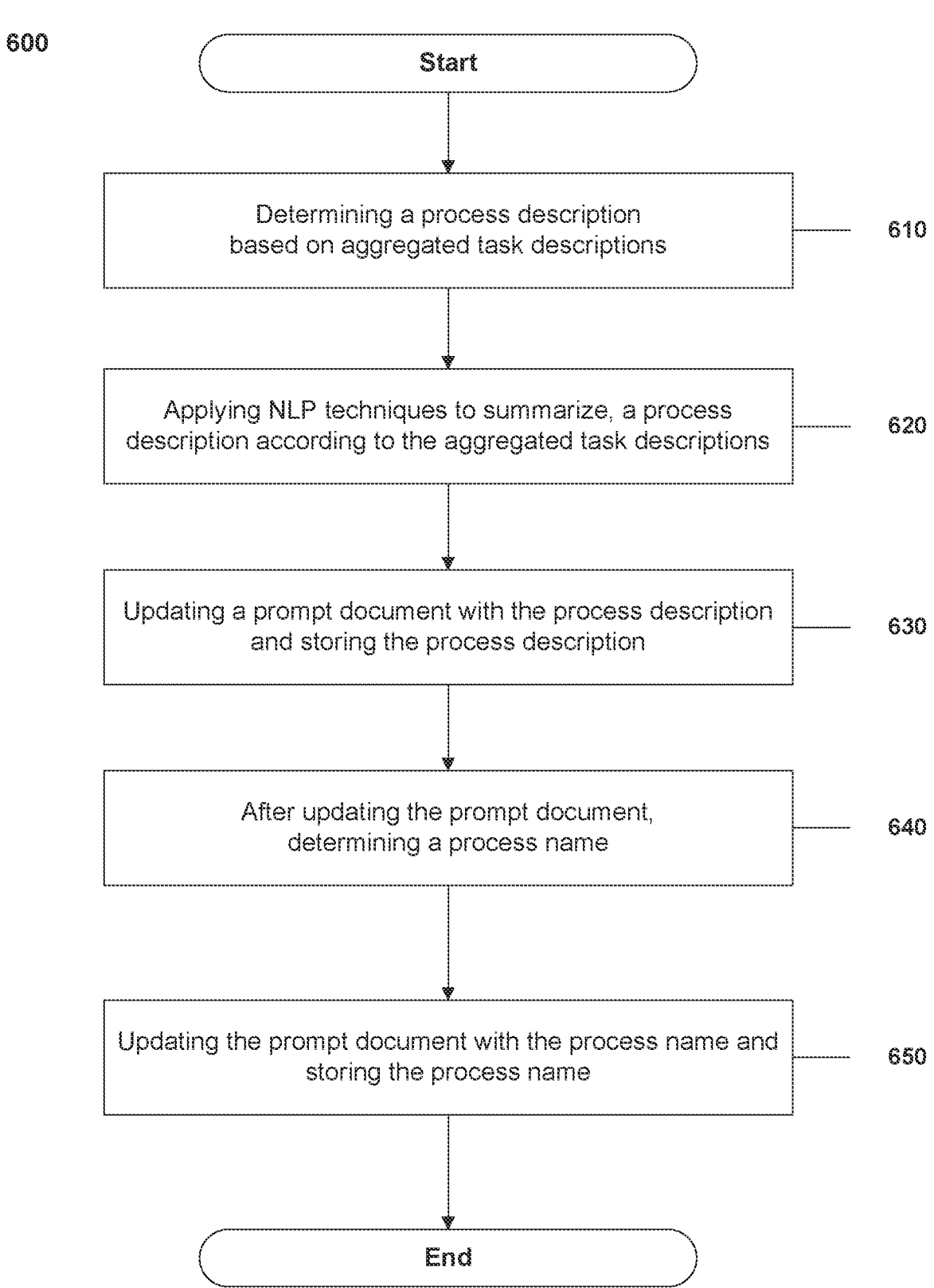

Start

Determining a process description
based on aggregated task descriptions — 610

Applying NLP techniques to summarize, a process
description according to the aggregated task descriptions — 620

Updating a prompt document with the process description
and storing the process description — 630

After updating the prompt document,
determining a process name — 640

Updating the prompt document with the process name and
storing the process name — 650

End

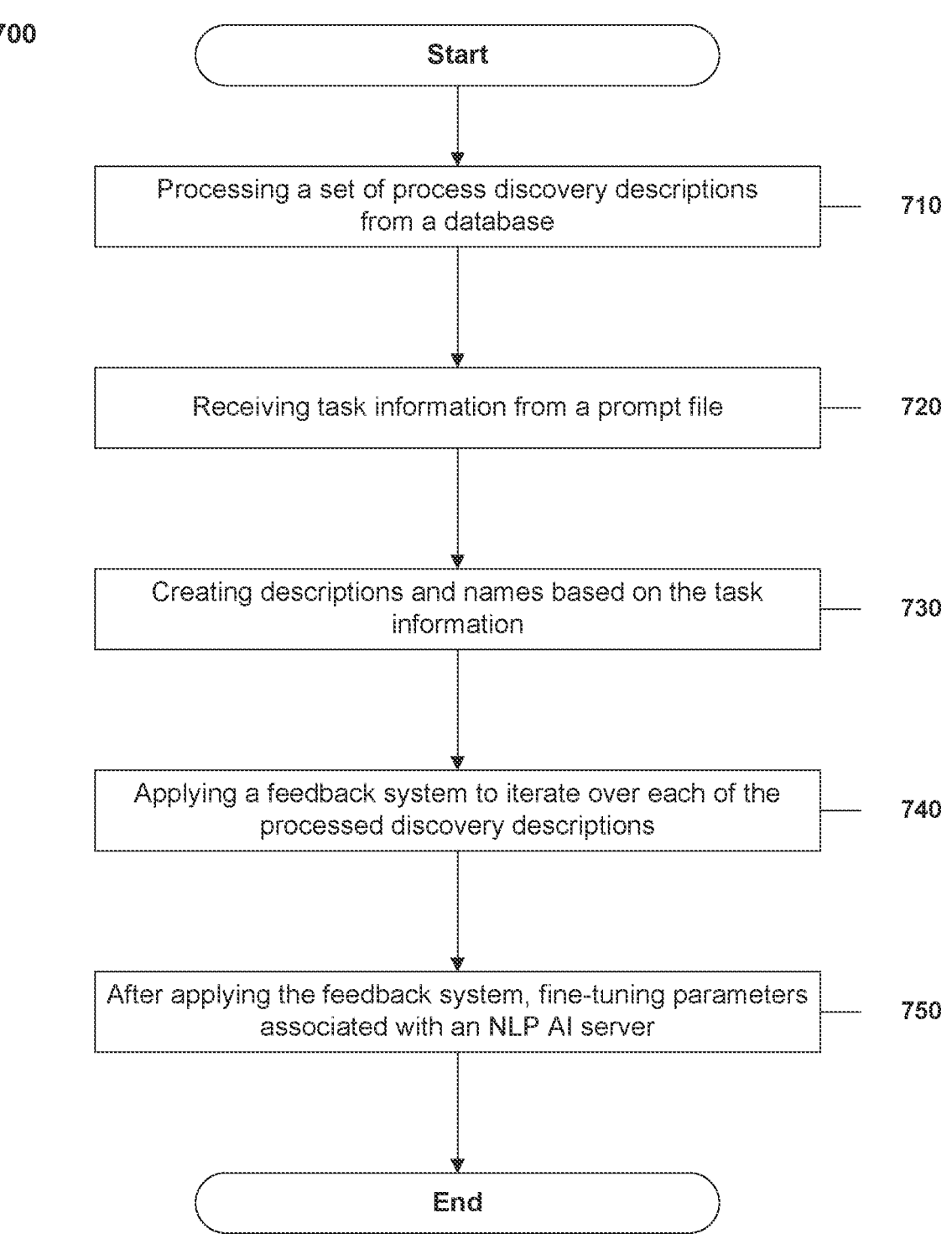

Start

Processing a set of process discovery descriptions from a database — 710

Receiving task information from a prompt file — 720

Creating descriptions and names based on the task information — 730

Applying a feedback system to iterate over each of the processed discovery descriptions — 740

After applying the feedback system, fine-tuning parameters associated with an NLP AI server — 750

End

FIG. 7

AUTOMATED ANALYSIS OF COMPUTER-DETECTED EVENT ACTIVITY TO IMPROVE RELATED TASK PERFORMANCE

CROSS REFERENCE TO RELATED APPLICATIONS

This application claims the benefit of U.S. Provisional Patent Application No. 63/450,596, filed Mar. 7, 2023 and entitled "Automated Analysis Of Computer-Detected Event Activity To Improve Related Task Performance," which is hereby incorporated by reference in its entirety.

TECHNICAL FIELD

The following disclosure is generally directed to techniques within the field of artificial intelligence (AI) for automatically analyzing computer-detected event activity to improve further computer processing, such as to determine tasks performed that cause the events, to use natural language processing (NLP) to generate textual descriptions of the tasks, and to use the generated descriptions to improve further processing related to the tasks.

BACKGROUND

As computers have become increasingly ubiquitous, various problems have arisen with their use, including difficulties in tracking and processing user events that are performed due to, for example, the vast amounts of data that are generated. Even if user events are tracked, with corresponding data generated in a digitally encoded format, it is challenging to decipher what activity a user performed at their computing device and to what task the activity can be attributed. Accordingly, it would be beneficial to have improved techniques for analyzing tracked user event data in order to provide improved computing task performance.

BRIEF DESCRIPTION OF THE DRAWINGS

FIG. 3 presents a flowchart for automated process discovery.

FIG. 6 presents a flowchart for performing NLP techniques on processes.

FIG. 7 presents a flowchart for applying feed-back, fine-tuning parameters, and performing continuous optimization.

DETAILED DESCRIPTION

The present disclosure describes a solution with techniques for performing automated operations that include analyzing computer-detected event activity to improve further computer processing, such as to determine tasks performed that cause the events, to use natural language processing (NLP) to generate textual descriptions of the tasks, and to use the generated descriptions to improve further processing related to the tasks. These automated operations are performed using computing devices and may be implemented within various computing paradigms (such as client-server models, cloud computing models, cluster computing models, and the like).

Embodiments, as disclosed herein, detail a set of methods, systems, and articles of manufacture described through reference to drawings. Examples provided in the following paragraphs relate to automated operations for the collecting of user action data, tracking/filtering of user action data, determination of significant event data, process discovery via use of an artificial intelligence (AI) GPU complex, AI post-processing, data preparation, event summarization, processing of extract information from the summary, grouping steps into a step grouping array, NLP techniques for step summarization of steps of the array, NLP techniques for task description, NLP techniques for task names, NLP techniques for process descriptions, and NLP techniques for process names.

Methods of this solution are executed in the form of code, logic, instructions, and algorithms that carry out the steps of this solution. Systems for this solution are executed on hardware elements readily configured to execute software performing steps of this solution. Articles of manufacture include but are not limited to non-transitory computer-readable storage mediums, computer-readable signal mediums, and other means of transmitting/storing executable instructions, which upon activation, carry out the steps of this solution in a variety of computing devices.

Before considering the methods, systems, and articles of manufacture in specificity, this detailed description first outlines hardware components of a computing environment with one or more computing devices.

Figure 1:
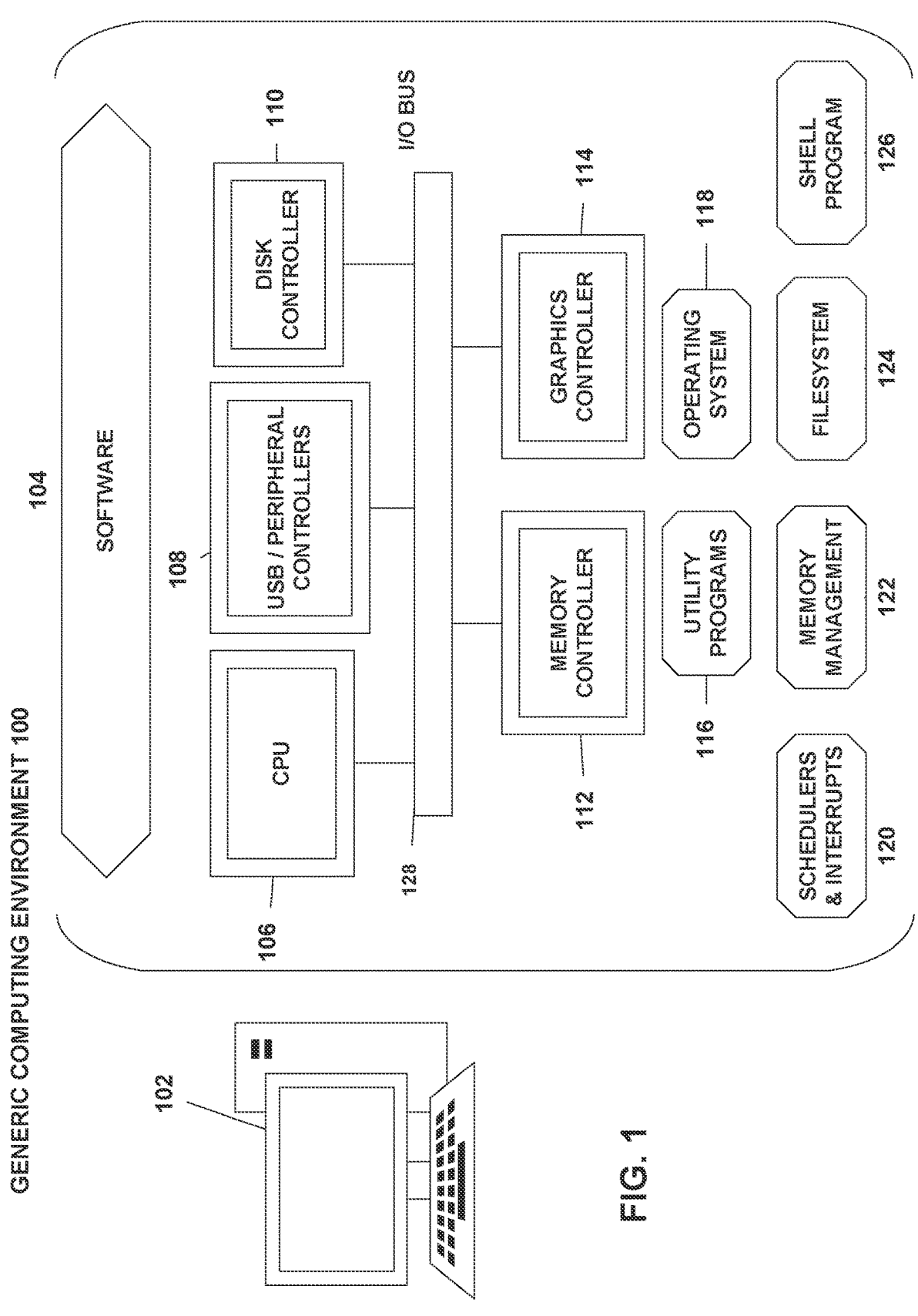
FIG. 1 presents an example of a computing environment.

FIG. 1 depicts a computing environment 100 with an exemplary computing device 102, which includes a desktop, a workstation, a hand-held device, a mobile device, a computing appliance, and any other device capable of performing computing operations. An exemplary computing device 102 includes one or more software programs 104 (e.g., application software, middleware, driver software, etc.), one or more central processing units 106, one or more USB or peripheral controllers 108, one or more disk controllers 110, one or more memory controllers 112 associated with random access memory (RAM), and one or more graphics controllers 114. Furthermore, the exemplary computing device 102 includes one or more utility programs 116, an operating system 118, one or more schedulers and interrupts 120, one or more memory management modules 122, a filesystem 124, and a shell program 126. The computing environment also uses an input/output bus (I/O bus) that transmits data of the computing device 102—and receives data of other computing devices—along pathways from input devices (e.g., keyboard, mouse, peripheral devices providing input signals, etc.) to output devices (e.g., graphical user interface, printer, etc.). The I/O bus can also transmit and/or receive data between the computing device and a network connected to the computing device.

Of importance to this solution, a specialized computing environment is disclosed herein. Examples of this solution are performed within this environment, which in at least some embodiments contains a plurality of proprietary on-premises computing devices belonging to an organization, therefore representing an on-premises computing environment.

Figure 2:
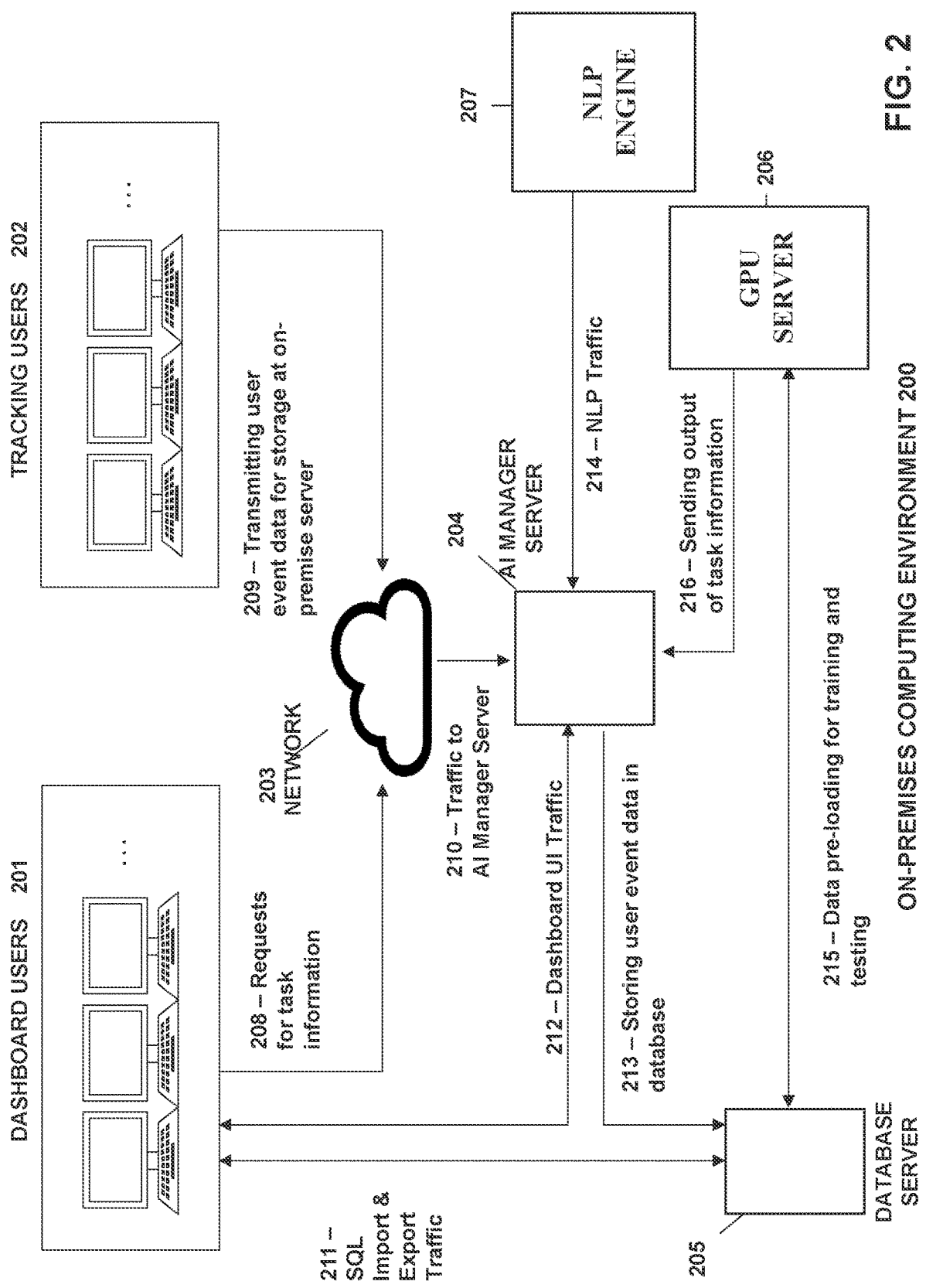
FIG. 2 presents an overview of a specialized computing system for use in implementing at least some of the described techniques in some embodiments.

In FIG. 2, a specialized computing system (on-premises computing environment) 200 has client devices of dashboard users 201 and tracking users 202 and server devices 204, 205, 206, 207 communicating over a network 203. The boundary is established between client devices and server devices of a system 200. Client devices have the same components as a computing device or a variant thereof. Client devices also have input devices or output devices, such as one or more peripheral devices, one or USB devices, one or graphical user interfaces (GUIs), one or more Ethernet ports, one or more audio ports, and other similar hardware elements attributed to client devices. Examples of client devices include a desktop, a workstation, a laptop, a smartphone (or other hand-held device), and any other example of a computing device serving as means to communicate with a server device. A client device further provides one or more requests across a network connected to a server device. Server devices represent physical devices or appliances that have one or more of processors, chassis, network cards, memory, hard drives, storage and power supplies. These physical devices or appliances serve clients by executing software or programs to manage access to centralized resources or services on a network. A server device is further configured to run software components embodying functionality of this present solution. In a typical scenario of device communications, client devices are sources of network-based requests that provide appropriate data to the devices at server locations for processing. Upon completion of the processing, responses are sent back to the client devices. All computing elements of this solution reside within an on-premises environment belonging to respective client organizations or client entities.

Client devices within this specialized computer system include those of dashboard users 201 and tracking users 202. With respect to dashboard users 201, these users may, for example, be users that have visibility privileges to review information about activities of tracking users 202, as well as to information generated by performing the steps of this solution. Client devices of the dashboard users 201 execute dashboard software configured to access user event information and display process information via a dashboard graphical user interface (or dashboard GUI). With respect to tracking users 202, these users may be members of organizations who perform various tasks, including participating in various activities that include interactions with their client devices. Client devices of the tracking users 202 execute tracking software configured to track user events in real time, as the tracking users use the software and tools of their respective client devices. Additionally, in an embodiment not represented in the drawing, an NLP engine receives prompt data for a few-shot learning procedure that prepares the server to perform NLP techniques. The prompt data represents few-shot examples that can add/modify/update the few-shot samples stored at the NLP engine to improve the output results after performing the NLP techniques. Further details about the few-shot learning will be described elsewhere herein, including with respect to FIG. 4.

To further elaborate on the tracking users, individual instances of the tracking software are installed on the client devices of the tracking users and executed to listen for user actions. Examples of actions performed by the tracking user include keypress inputs, mouse clicks, mouse hovers, selections of user interface elements on the tracking user client devices, and other similar actions. These actions emit byte sequences formatted as packets of binary input data capable of being captured by the tracking software. In order to detect user actions, a filtering logic of the tracking software reads the byte sequences as input data and determines how to interpret the sequence.

In a typical scenario, a tracking user may perform repetitive actions that are either significant activity actions or non-significant activity actions. The significant activity actions pertain to byte sequences that correspond to significant actions that advance the progress of a task, such as opening a word processing application, reviewing a document, reading an e-mail, writing an e-mail, and the like. The non-significant activity actions, on the other hand, pertain to byte sequences for other types of actions that do not advance the progress of a task, such as repetitive actions involving aimlessly moving a mouse around, recurrent keypress inputs, and other such actions. A group of multiple related significant activity actions involved in performing a task is referred to as an event.

The filtering logic reads in a stream of byte sequences corresponding to multiple tracked user actions. Next, the filtering logic detects events that satisfy one or more criteria defined for a set of activity actions, referred to herein as "significant value events", that are eligible for a process discovery AI. To identify one or more significant value events, the filtering logic buffers the byte sequences (e.g., in real-time), groups them in temporal order, and checks the groupings against a defined group of activity actions to determine whether the groupings of byte sequences match one or more activity actions of the defined group. Responsive to determining that the byte sequences match one or more activity actions of the defined group, the filtering logic classifies the action as one of the significant value events. Next, the significant value event is categorized and recorded (e.g., in real time), and further logged to a storage of the client device. Responsive to determining that the byte sequences do not match the one or more activity actions of the defined group, the filtering logic classifies the byte sequences as non-significant actions and removes them from the buffered sequence, in order to receive a new sequence of bytes. Each of the significant value events is then sent to the server-side components.

In an example use case, a user can perform a first byte sequence of mouse hovers and mouse clicks to change display settings for their client device. In another example use case, a user can perform a second byte sequence of mouse hovers and mouse clicks to open a word processing application and work on a document related to performing a task. The filtering logic will consider the first byte sequence and the second byte sequence for analysis, each in real time, and thereby classify each byte sequence as an activity action. As a result, the filtering logic considers both byte sequences as significant value events to be prepared for a process discovery phase at the server-side component. After preparation, the filtering logic will send the significant value events to the server-side components for process discovery and NLP translation.

Server devices within this specialized computer system include an artificial intelligence manager server (or AI manager server) 204, a database server 205, a graphical processing unit (GPU) server complex 206, and a natural language processing engine (or NLP engine) 207—while not illustrated here, each such server will include various hardware components (e.g., storage, computing capabilities, etc.) and be configured (e.g., with corresponding programming) to perform corresponding operations. An AI manager server 204 is a server component that manages when and how a set of AI processes (e.g., deep learning processes, NLP processes, etc.) take place. Implementations of the AI manager server coordinate the process discovery AI phase and the data preparation for multiple NLP phases. A database server 205 is a storage server component that records and/or updates data about user events. Examples of a database include MySQL, MongoDB, PostgreSQL, and the like. A GPU server complex 206 is a collection of graphical processing units (GPUs) purposed for automated operations to perform process discovery artificial intelligence (or process discovery AI). Implementations of the GPU server complex are configured to allocate resource packages that create container instances to execute process discovery AI operations via one or more of various types of deep learning techniques, e.g., classic neural networks, recurrent neural networks, generative adversarial neural network, and so on.

In one or more embodiments, the NLP engine may preferably have model data available from previous training phases (either on-line training phases or off-line training phases), with the model data representing a plurality of language processing models. These language processing models include pre-trained or pre-generated language, which are useable to receive human language, understand associated words, interpret the human language, and/or predict relevant information from the language processing models, such as meanings, word probability, and intents (e.g., the intended outcome of a behavior), based on user inputs or user stimuli.

In some embodiments, the model data may include a machine learning model or deep learning neural network model that has large amounts of relevant and sophisticated machine-generated text. In accordance with such model data, the NLP engine may additionally or alternatively implement one or more ensembles of pre-trained or trained machine learning models. Examples of learning techniques for model data generation may include one or more of: supervised learning (e.g., using logistic regression, back propagation neural networks, random forests, decision trees, etc.), unsupervised learning (e.g., using an a priori algorithm, K-means clustering, etc.), semi-supervised learning, reinforcement learning (e.g., using a Q-learning algorithm, temporal difference learning, etc.), adversarial learning, and any other suitable learning technique. Each module of the plurality can implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, density-based spatial clustering of applications with noise (DBSCAN), expectation maximization, etc.), a bidirectional encoder representation form transformers (BERT) for masked language model tasks and next sentence prediction tasks and the like, variations of BERT (i.e., ULMFiT, XLM UDify, MT-DNN, SpanBERT, RoBERTa, XLNet, ERNIE, KnowBERT, VideoBERT, ERNIE BERT-wwm, MobileBERT, TinyBERT, GPT, GPT- 2, GPT-3, GPT-4 (and all subsequent iterations), ELMo, content2Vec, and the like), an associated rule learning algorithm (e.g., an a priori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and any suitable form of machine learning algorithm. Each processing portion of the system 100 can additionally or alternatively leverage one or more of the following: a probabilistic module, heuristic module, deterministic module, or any other suitable module leveraging any other suitable computation method, machine learning method or combination thereof. However, any suitable machine learning approach can otherwise be incorporated in the system 100. Further, any suitable model (e.g., machine learning, non-machine learning, etc.) may be implemented in the various systems and/or methods described herein.

In one example embodiment, the NLP engine is a component existing in an on-premises environment that be accessed, configured, re-configured, and optimized by the owners/admins of the on-premises environment. The model data is represented as a deep learning neural network model. Furthermore, the model data is generated and/or outputted by the NLP engine, which may be capable of predicting and/or inferring responses for each individual user based on user input.

Pertaining to the overall system, all components are interconnected via a network 203 which directs, routes, and distributes data within the specialized environment. Network 203 is a set of communication links that enable client devices to connect to server devices and perform bi-directional communication of data. Network 203 is capable of transmitting data from one endpoint to another, and it can involve wired connections, wireless connections, or a combination thereof. Network 203 may involve different network communication technologies, standards and protocols, as well-known to those of ordinary skill in the art. Several types of networks use a variety of communication technologies, for example, Local Area Network (LAN), Wide Area Network (WAN), Wireless Local Area Network (WLAN), Enterprise Private Network (EPN), Virtual Private Network (VPN), and the like. Several types of networks use a variety of standards, for example, IEEE 802.3, V.90 modems, RS-232C, HTML, H.323, and the like. Several types of networks use a variety of protocols, for example, Hypertext Transfer Protocol (HTTP), Transmission Control Protocol/Internet Protocol (TCP/IP), Wireless Application Protocol (WAP), and the like, to communicate with one another. Further the network 122 may include a variety of network devices, including routers, bridges, servers, computing devices, storage devices, and the like.

Of further note, the GPUs of the GPU server complex (or GPU container complex) 206 can be embodied as specialized processing units or specialized electronic circuits. Originally, GPUs were designed for rendering images or graphical content in a frame buffer, with an intended goal to output the images or graphical content to a display device. Such GPUs may be included within any of the computing devices that are part of the server complex described above for our specialized computer system, where other examples of individually scalable components of such a server complex can include computing components (e.g., CPUs, FPGAs, ASICs), networking components, storage components, memory components, software components, and others. Furthermore, with respect to the GPUs, the server complex described above may also include neural network processors ('NNPs') for use in various aspects of neural network processing.

Communications within this specialized on-premises computing environment are identified with elements 208-216. In FIG. 2, unidirectional communication is depicted with an arrow in one direction. Bi-directional communication is depicted with an arrow that has two heads, one at each end of the arrow.

During execution of the specialized system, automated process discovery software is executed based on data received from the client devices of the tracking users. Results of this process discovery are displayed to the dashboard users 201. The dashboard users 201 are configured to provide requests 208, through the network 203, for task information from the AI manager server 204. Prior to the automated process discovery, tracking users 202 are configured to transmit 209, through the network 203, significant value events for storage at the database server 205. The AI manager server 204 validates this network traffic by verifying and approving this network traffic to confirm the significant value events have been transmitted from a valid tracking user. Subsequently, the AI manager server stores the significant value events 213 in the database server 205 server and updates the data representation to add or replace the significant value events stored within the database manager server 205. In addition, the significant value events are accessible by one or more of dashboard users 201 and can be imported/exported as traffic between the database server 205 and dashboard users 201. The significant value events can also be pre-loaded for training and testing 215 to the GPU server complex.

In parallel or after the AI manager server 204 receiving and validating the network traffic 210, a process discovery AI phase takes place. In the process discovery AI phase, a GPU server complex 206 implements a neural network for the process discovery AI. The neural network is implemented to receive a dataset of significant value events, then predict both 1) respective task index events associated with the significant value events, and 2) respective process index events associated with the significant value events. The neural network executes activation functions for a training process, to accurately predict the respective task index events and the respective process index events.

The NLP engine 207 is a computing component that receives the task information as input—which will be detailed in later paragraphs—and performs NLP techniques to output human-readable names and descriptions. This will be elaborated upon, in reference to FIG. 4.

With the information from a combination of process discovery AI and NLP, an AI manager server can provide dashboard user information, which is transmitted as dashboard UI traffic. The dashboard user information is a customized display that represents user tasks along with human-readable language for specific process information.

These automated operations enable the automation of tasks, such as to reduce computing resources and/or processing time used to perform such automated tasks. By implementing a medley of AI techniques within the on-premises computing environment of an organization, the management-level staff personnel can proceed in optimizing specific tasks for automation. Benefits of this specialized computing system include a layer of algorithms that enable automation of process discovery. The disclosed system of this solution provides a novel infrastructure design to obtain tracked user events, execute a process discovery AI, and use NLP to obtain names and descriptions associated with higher-level processes. By using an implementation with containers of the GPU server complex (or GPU container complex), deep learning experiments can be applied to real-time significant value events, thereby outputting 216 a sophisticated deep learning model that encodes valuable information for actual performance of tasks. In addition, by performing some of the automated operations on the tracking users' client devices before transmitting corresponding to the AI Manager Server, and by performing some other of the automated operations on the server devices separate from the tracking users' client devices, various benefits may be achieved, such as limiting network traffic to only the event data identified as being significant value events, optionally maintaining privacy related to some types of other event data that is not transmitted, etc. Similarly, by implementing some or all of the server devices on an organization's premises and under their control, various additional benefits may be achieved, such as limiting network traffic outside of the organization, maintaining privacy and/or secrecy related to at least some types of other event data, etc. Delving into methods of this specialized computing environment, this detailed description presents the series of steps FIG. 3, FIG. 4, FIG. 5, FIG. 6, and FIG. 7.

FIG. 3 presents a flowchart for process discovery AI performance in an automated manner within the specialized environment. Computing components involved with this process discovery AI include, but are not limited to, one or more client devices for a set of tracking users, a set of containers that executes critical steps of the process discovery, and an AI manager server designed to both provide inputs for process discovery AI and receive output of the process discovery AI.

As illustrated in FIG. 3, method 300 of this flowchart begins in a scenario wherein a set of tracking users perform detectable user actions on one or more respective client devices. These detectable user actions are tracked via byte sequences and converted (e.g., in real-time) from byte sequences to a set of significant value events.

At 310, the AI manager server monitors the set of significant value events associated with one or more tracked user actions. In some embodiments, AI manager server considers system-specific factors, such as the data size at different time intervals of a day, storage frequency at each day of the week, and resource allocation to each container for optimal performance.

At 320, the set of significant value events are stored at a database server and updated thereon. The database server is located server-side and may be accessible via one of many means of connection. Furthermore, the database server may include a database connection string that can provide access to a database server having the most up-to-date information about significant value events. In addition, the database also stores samples of defined task features and defined process features. There is a mapping between combinations of features and an individual target label. In other words, each target label identifies a combination of features that are linked to a unique task and features that are linked to a unique process. The target labels are used to generate a data representation purposed for multi-label classification.

At 330, the GPU server complex ingests a subset of significant value events and partitions the data onto container instances of a GPU server complex that perform deep learning techniques, to process data in a training phase for a process discovery AI. It is reiterated that a GPU server complex implements a neural network for the process discovery AI and continually or repeatedly extracts time information associated with each of the significant value events, thereby determining a task for which user events are performed. On the GPU server complex, software images are loaded onto a set of containers capable of being instantiated. The software images include software programs to be loaded on each container, to execute logic for the process discovery AI. The software programs may be the same on any subset of the containers or may be different on any subset of the containers. These containers operate in tandem to perform deep learning techniques by training a dataset of user events and generating a model from which task information can be derived. In some embodiments, the container instances are portable resource packages that perform accelerated instructions established on a hardware architecture composed of multiple graphical processing units (GPUs) capable of being interconnected to cooperate in each training phase and execute scheduled instructions of a neural network model. The resource packages may include required frameworks, pre-installed libraries, pre-installed drivers, and/or other pre-configured necessary components. Further, the containers are enabled to execute programs for the neural network in a performance-optimized hardware environment. In further embodiments, the containers are scheduled to be instantiated according to an environment-specific policy.

At 340, the GPU server complex performs the process discovery AI to determine relevant task index events using the deep learning techniques. The task index events are sent to the database server for storage. Subsequently, the AI manager server retrieves that task index events and generates a summary of task information known as task-important events (TIEs), based on the significant value events. This summary of TIEs is purposed to describe task information for each tracking user, and represent one or more task workflows for each tracking user. In further detail, the summary of TIEs consists of all task index events for the interval of time in which the respective tracking user performed their significant value events. In this embodiment of this solution, the GPU server complex implements a neural network as a deep learning architecture. Nonetheless, there also exists alternative embodiments with other forms of deep learning architectures, such as transformers, auto encoders, deep belief networks, deep residual networks, and the like, which can be implemented to execute a different form of process discovery AI.

To perform the process discovery AI, datasets are ingested by the neural network and trained to generate models. Periodically, the GPU server complex will also retrieve an updated data representation of defined samples to use for the multi-label classification.

This process discovery AI begins with the GPU server complex 206 polling the database server to retrieve the latest dataset of the significant value events as input data. After retrieving these significant value events, the GPU server complex 206 pre-loads the significant value events as input for a training phase. The significant values are also compared with expected outputs during a testing phase. The training phase processes the input significant value events through a neural network. During the training phase, a set of information including attributes and values are extracted from the dataset of significant value events and provided to the neural network. The neural network then passes this extracted set of information through layers of nodes, with each node processing a portion of the information to create or update a neural network model. Based on the neural network model, one or more predictions may be generated about the task associated with the significant value events. Next, a testing phase is performed to compare the predicted task with defined information about the significant value events and the tasks they are commonly associated with. If the predictions of the training phase meet a threshold amount, a set of task information is outputted and mapped to the significant value events. The purpose of this mapping is to establish a correlation between the significant value events performed by the tracking user and a particular task that the tracking user was most likely performing (with the highest likeliness).

By doing so, the neural network generates a deep learning model for the task information and stores the deep learning model in the database server. Based on the user event frequency, containers are instantiated within the GPU server complex work in tandem to classify a task for each user event based on predictions from a deep learning model. In summary, the training phase, as aforementioned, involves deep learning on a neural network. The dataset contains user events, also known as significant value events. And the labels have multiple values, each label representing information about a type of task associated with a grouping of events. Based on the data and the labels, predictions are made via a neural network to determine which type of task is being performed, in accordance with the grouping of user events of the dataset. The predictions are intended to map the user events to one or more tasks on which the neural network has been trained. After completing the multi-label classification of the tasks, a model is provided for testing the predictions against expected results. If the predictions for all significant value events match the expected results for all tasks, due to the prediction being at or above an appropriate threshold, then a table of task index events is created using the predicted tasks. Each task index event depicts an input event being mapped to a task output resulting from the classification, after performing the deep learning. After being generated, the table of task index events is stored within the database server for a next step of the process discovery AI. In a next step of the process discovery AI, the GPU server complex ingests the table of task index events. Then, the containers of the GPU server complex perform a further training phase and further testing phase to predict process information and create a table of process index events, using the same or similar prediction techniques (as applied on the events to output tasks) to generate output process information. The table of process index events are also stored to the database server, thereby completing the process discovery AI. While the illustrated embodiment shows performing training activities for the process discovery AI followed by use of the trained process discovery AI, in other embodiments, the training and usage may be performed in other manners, such as in completely separate phases, with both activities intermixed (e.g., doing training in a continuous or other repeated manner), etc.

At 350, the process discovery AI is completed. This is indicated by new tables of index events (task index events and process index events) which are made available to the AI manager server. And finally, at 360, the AI manager server 204 retrieves both the table of task index events and table of process index events.

Steps and operations described, in part or in totality, for FIG. 3 bring forth a means to perform process discovery AI on various computing paradigms. The tracking users provide data about events and activity (e.g., as real-time traffic), which is sent across the network to the server side to be stored. This data is also capable of being made available for analytics. Additionally, this data may be prepared by the AI manager server, made accessible from one or more database servers, and easily ingested by the GPU server complex. The GPU server complex ingests the data as input to predict a task associated with a set of significant value events. On the GPU server complex, a neural network (or similar deep learning architecture) is formed with layers of node that predict an output based on attributes and/or characteristics of input data. Examples of a neural network, include but are not limited to, an artificial neural network (ANN), a convolutional neural network (CNN), a deep forward neural network (DFNN), a recurrent neural network, and any other variant of a neural network that is useable to perform the prediction, such as using the nodes to receive the significant value events at the input node layer, perform calculations between hidden node layers after the input node layer, and classify the user event as an output task information represented in an output node layer. In summary, the input of the significant value events is mapped to an output prediction of output task information. Examples of output task information include a task identifier, application name associated with the task, task score, task volume, task complexity, automation potential, and other similar items of task information.

In some embodiments, the output task information may be aggregated for each tracking user, by one of the server-side components. Values associated with the output task information are extracted. Subsequently, a set of analytics is generated from the values by performing statistical calculations on the values and determining analytics result data, such as task count, accuracy percentage of task performance, task frequency, number of applications involved with a particular task, and other data that can be derived as analytics result data.

In at least one embodiment, the AI manager server aggregates the task information and computes the analytics results for the dashboard users.

By using these steps and operations, a set of deep learning techniques enable automated analysis of significant value events. A system can benefit from a neural network that processes the significant value events and improves its prediction accuracy over time, as information continues to pass information though the layers of the neural network. This brings forth a process for seamlessly determining task important events (TIEs) from tracked user events over time, with consistently improving predictions.

Figure 4:
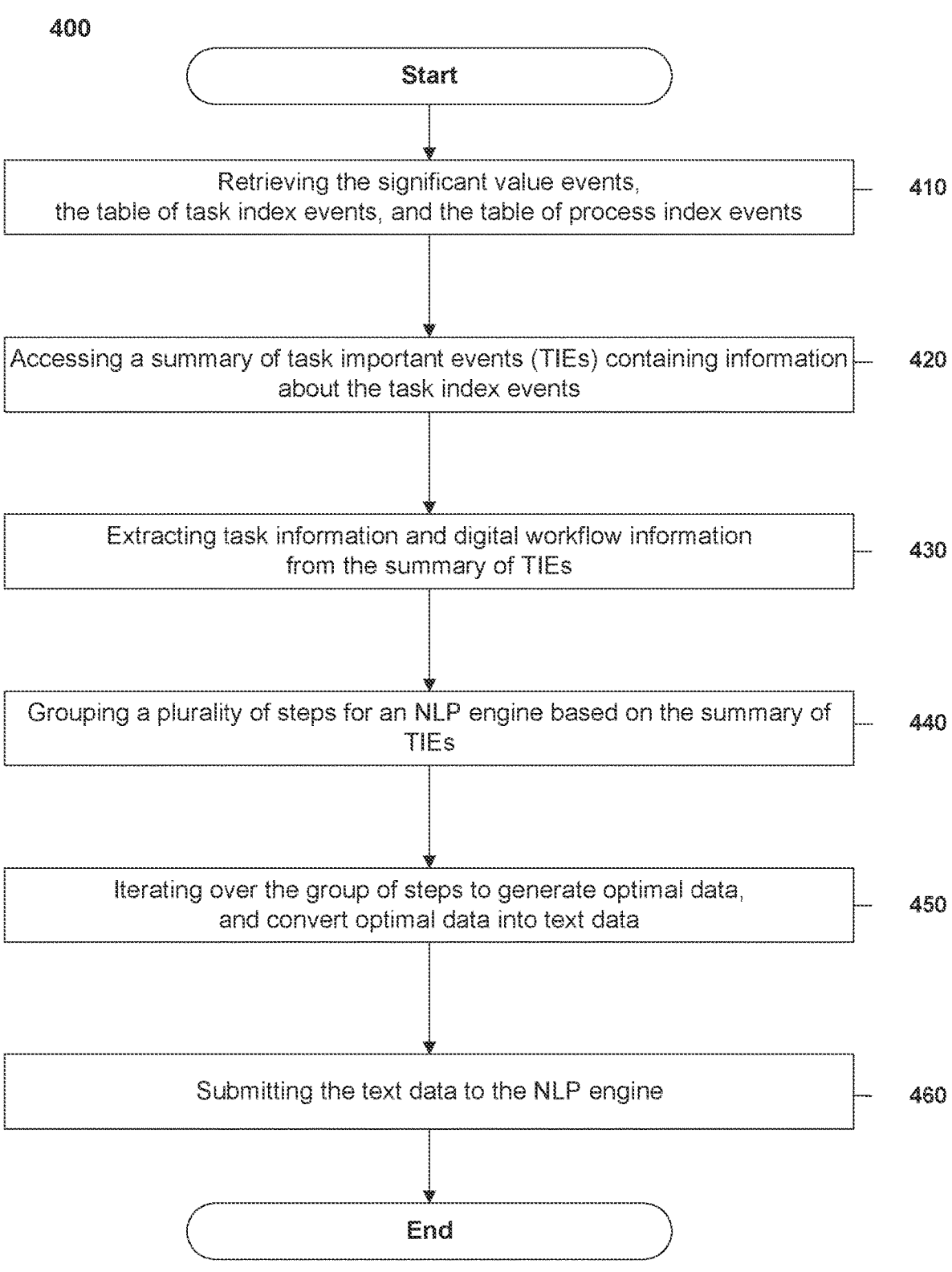
FIG. 4 presents a flowchart for an automated post-processing procedure following the automated process discovery.

FIG. 4 presents a flowchart for an AI post-processing procedure following the process discovery AI. As illustrated in FIG. 4, method 400 of this flowchart also begins in a scenario wherein a set of tracking users perform detectable user actions on one or more respective client devices. During the AI post-processing, the AI manager server 204 uses up-to-date results of the GPU server 206. In particular, the AI manager server 204 can obtain significant value events from the database (as seen at step 213 of FIG. 2) and perform a closing procedure with the collection of task index events and process index events. To perform the closing procedure, the AI manager server determines task information for each of the tracking users 202. The task information corresponds to a recorded timestamp for each TIE and encapsulates the user actions that each tracking user performed. Next, the AI manager server 206 iterates over TIEs in the summary of TIEs, using the timestamp, to determine a unique subset for each TIE. The purpose of the subset is to categorize the TIE as being mapped to a specific application that the tracking user was running. The unique subset of the TIE corresponds to the specific application running at the time of the TIE. Upon receiving all task information, the AI post-processing is complete. Important aspects of AI post-processing involve transforming the summary of TIEs into a set of high-level steps ready to be provided for NLP processing.

In further detail, this post-processing begins at 410. At 410, an AI manager server retrieves the significant value events, the table of task index events, and the table of process index events.

At 420, the AI manager server accesses the summary of TIEs containing information about the task index events. The AI manager server first creates an empty prompt document that will be provided to the NLP engine. Next, the AI manager server executes a context processing algorithm that iterates over each significant value event and identifies the task index event associated therewith. In a first iteration, the AI manager server applies the algorithm to read the task index event in context and generate a set of syntactical elements (e.g., words, pronouns, prepositions, adjective, adverbs, etc.) and relevant synonyms. Finally, the AI manager server writes a low-level step to the prompt document using those syntactical elements and relevant synonyms. The low-level step is a phrase depicting an action performed by the user for identified task index event. This low-level step is written onto the empty prompt document, providing a first definition of a first task index event of the summary. In subsequent iterations, the AI manager server applies the context processing algorithm again and generates further low-level steps, and all of which are added to fill out the prompt document. The AI manager server 206 can format data about the summary of TIEs and make it available to dashboard users 201. Additionally, data about the summary is transmitted in the form of dashboard user traffic (as seen at step 212 of FIG. 2).

At 430, the AI manager server extracts task information and digital workflow information from the summary of TIEs. Next, at 440, the AI manager server groups a plurality of steps for the NLP engine. At 450, the AI manager server iterates over the group of steps to generate optimal data, and then convert optimal data into textual representation of data. Finally at 460, the textual representation of data is submitted to the NLP engine.

After executing the process discovery AI in a process discovery phase, a parallel procedure takes place, which involves a few-shotting process that provides working examples of data, while an NLP translates high-level steps into process information. In particular, few-shot examples of prompt data are provided to the NLP engine. The prompt data specifies samples of high-level steps that the NLP engine extracts in order to determine intents associated with steps, tasks, and processes. The few-shotting process begins when the prompt data can be stored at the database server and updated at any time. From the storage location at the database server, the AI manager server retrieves the prompt data. Next, the AI manager server provides the prompt data to the NLP engine as working examples to be analyzed and interpreted for the goal of guessing intents. In particular, the NLP engine analyzes the prompt data for tokens, words, and synonyms. Next, the NLP engine derives conceptual relationships about the steps, tasks, and processes based on the prompt data and/or working examples. Examples of conceptual relationships include n-grams, term-frequency data tables, concept trees, word maps, vector space models, and the like. Finally, the NLP engine receives summaries of high level steps with a missing intent, and determines an intent name, based on the derived conceptual relationships.

In some embodiments, the NLP engine employs deep learning techniques to perform text summarization, thereby generating textual representation in natural language. This text summarization is performed using deep learning models such as, for example, CNN models, RNN models, sequence-to-sequence models, long short-term memory (LSTM) neural networks, Bidirectional Encoder Representations from Transformers (BERT) models, and other similar models.

During the NLP phases, NLP traffic is transmitted from the AI manager server to the NLP engine. And after the NLP engine completes processing the request, the NLP engine may draw out information and transmit resultant NLP traffic to the AI manager server. A set of high-level steps are provided from the AI manager server to the NLP engine, resultantly determining a task name and task description. Based on the task name and the task description, the AI manager server provides subsequent task information to the NLP engine, resultantly determining a process name and process description. The NLP engine returns this output to the AI manager server and makes it available for GUI dashboard display.

As described in FIG. 4, an innovative processing pipeline is presented herein. This solution provides a processing pipeline for detecting user event activity and translating the activity into identifiable process information that will improve task performance. Benefits of this AI post-processing procedure include a continuously optimized set of neural networks and an NLP engine that can convert information about user event activity into process information. In addition, the process information from the NLP results is capable of being displayed to authorized personnel, thereby outputting a visualization of user event activity.

Figure 5:
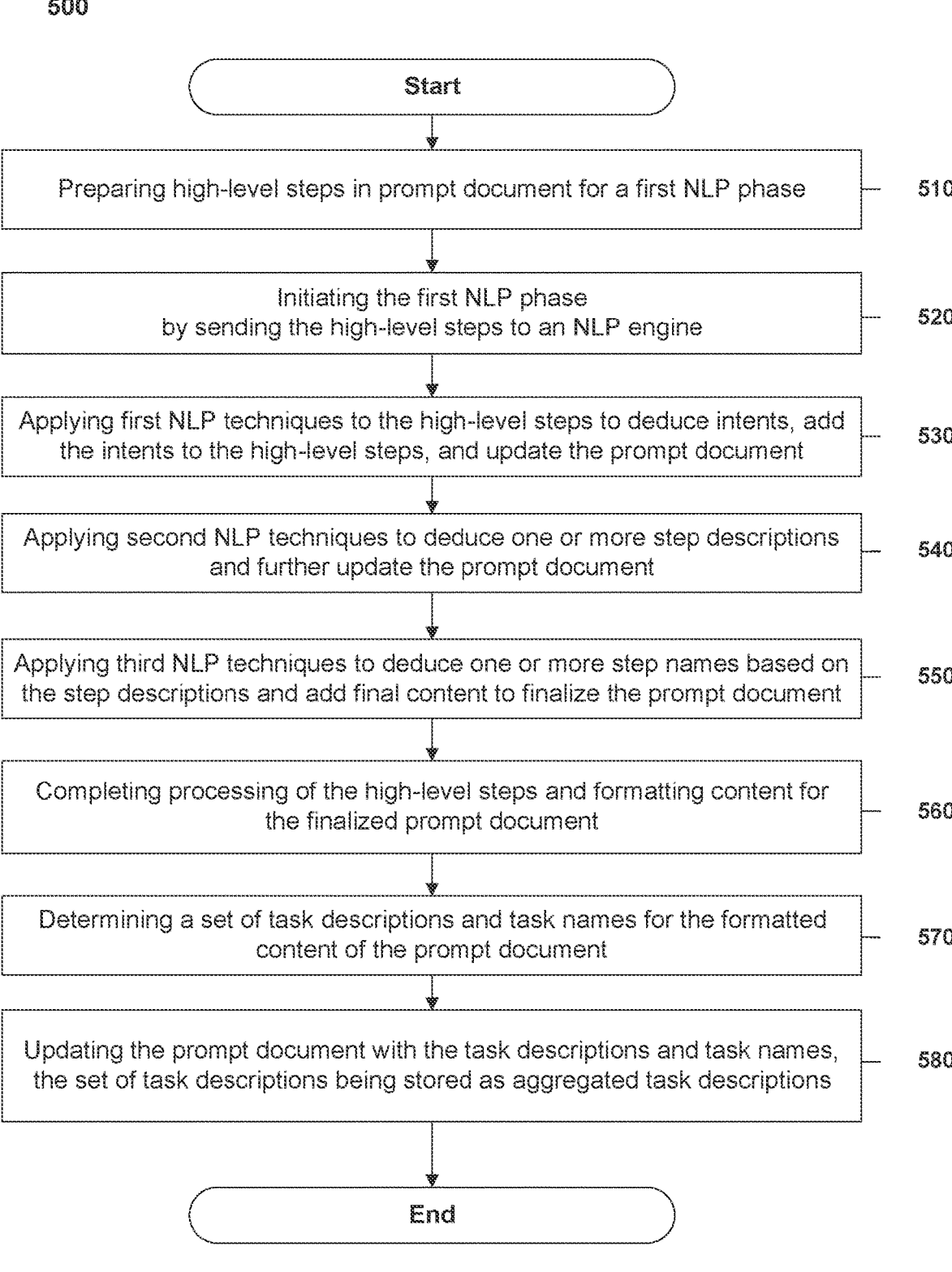
FIG. 5 presents a flowchart for performing NLP techniques on high-level steps and tasks.

FIG. 5 presents a flowchart for performing NLP techniques to determine step descriptions, step names, task descriptions, and task names from the high-level steps. As illustrated in FIG. 5, method 500 of this flowchart describes a first NLP phase.

At 510, the AI manager server prepares the high-level steps for a first NLP phase by reading over separate groupings of high-level steps in the created prompt document (or summary of TIEs). Next the AI manager server appends intent variables next to each grouping of the high-level steps. For the first NLP phase, each intent variable is appended to a respective grouping of the high-level steps in the summary of TIEs.

At 520, the AI manager server initiates the first NLP phase by sending the high-level steps to the NLP engine.

At 530, the NLP engine assesses the high-level steps, using first NLP techniques to deduce intents for the high-level steps and transmit the intents back to the AI manager server. To do so, the NLP engine begins by iterating over the groupings of high-level steps, then iterating over the low-level steps within each of the groupings and executing one or more algorithms of the NLP engine to deduce an intent of each high-level step. The algorithms parse each low-level step, analyze the words from the low-level step, make correspondences between the analyzed steps and the working prompt examples, and determine each intent for the separate groupings of high-level steps. The NLP engine deduces intents for each grouping of the high-level steps. Upon completion of deducing the intents, the NLP engine outputs the intents and transfers the intents to the AI manager server. The AI manager server receives the intents and formats the intents as content for the prompt document. To do so, the AI manager server adds each intent to its respective grouping of high-level steps. Next, the AI manager server arranges a copy of the intents together. The arranged intents are added as an entry to a step description section of the prompt document.

At 540, the AI manager server provides the updated prompt document to the NLP engine. The NLP engine uses second NLP techniques to deduce one or more step descriptions, using the same parsing and analysis techniques performed for the lower-level step. Accordingly, the NLP engine outputs the step descriptions and transfers the step descriptions to the AI manager server. The AI manager server receives the step descriptions and formats the step descriptions as further content for the prompt document. To do so, the AI manager adds the step descriptions to their respective intents. Next, the AI manager server arranges a copy of the step descriptions together. The arranged step descriptions are added as an entry to a step name section of the prompt document.

At 550, the AI manager server provides the updated prompt document again to the NLP engine. The NLP engine uses third NLP techniques to deduce one or more step names, using the same parsing and analysis techniques performed for the prior two deduced elements (the intent and the step description). Accordingly, the NLP engine outputs one or more step names and transfers the step names to the AI manager server. The AI manager server receives the step names and formats the step names as final content for the prompt document. To do so, the AI manager server adds the step names to their respective step descriptions, which completes production of formatted content for the prompt document.

At 560, the AI manager server completes the processing of high level-steps and proceeds to determine task descriptions.

At 570, the AI manager server determines a set of task descriptions and task names for the formatted content of the prompt document. The task descriptions and task names are determined by sending a request to the NLP engine, including the formatted content. The NLP engine receives the request and processes it accordingly. Subsequently, the NLP engine applies NLP techniques to review the formatted content and determine relevant terms, synonyms, and phrases. Upon completing the review and determination, the NLP engine generates one or more task descriptions and one or more task names for the respective steps. Next, the NLP engine transmits a response to the AI manager server, the response including the one or more task descriptions and one or more task names for the formatted content. Finally, the AI manager server receives the response with the task description(s) and task name(s) from the NLP engine.

At 580, the AI manager server updates the prompt document with received response information. The AI manager server also stores the one or more task descriptions as aggregated task descriptions. It will be appreciated that the AI manager server may store one or more task descriptions in a variety of manners. In some embodiments, the AI manager server may store the one or more task descriptions in the database server. In other embodiments, the AI manager server may store the one or more task descriptions within its own storage subcomponents. In yet other embodiments, the AI manager server may cache the one or more task descriptions or add them to a second temporary document for further analysis and assessment.

After storing this response, the AI manager prepares to define process information for the task descriptions and task names. In particular, the defined process information will consist of a process description and a process name.

FIG. 6 presents a flowchart for performing NLP techniques to determine a process from the task descriptions and task names, where information about the processes include process descriptions and process names. As illustrated in FIG. 6, method 600 of this flowchart describes a second NLP phase.

At 610, the AI manager server sends a request to an NLP engine for determining a process description, the request including aggregated task descriptions.

Subsequently, at 620, the NLP engine applies NLP techniques to summarize a process description according to the aggregated task descriptions. The NLP engine then transmits the process description to the AI manager server.

Next, at 630, the AI manager server receives the process description and updates a prompt document previously consisting of one or more steps, one or more step descriptions, one or more step names, one or more task descriptions, and one or more task names (as created and updated using steps of FIG. 5). The AI manager server also stores the process description.

Next, at 640, after updating the prompt document, the AI manager server sends a further request to the NLP engine for determining a process name, the further request including the process description previously summarized. The NLP engine receives the process description and creates a process name, using NLP techniques to understand the gist of the description, mapping keywords of the descriptions to other terms in the few-shot working examples (previously mentioned at FIG. 4), and determining the highest probability words that would make an appropriate process name for the process description. After determining the words, the NLP engine collates the words in sequence, thereby creating the process name. After creating the process name, the NLP engine transmits the process name to the AI manager server.

Finally, at 650, the AI manager server receives the process name, based on the process description, and further updates the prompt document. Subsequently, the AI manager server stores the process name. It will be appreciated that the AI manager server may store the process description and/or the process name in a variety of manners. In some embodiments, the AI manager server may store this information in the database server. In other embodiments, the AI manager server may store information within its own storage subcomponents. In yet other embodiments, the AI manager server may cache information or add it to a temporary document for further analysis and assessment.

Using both phases from FIG. 5 and FIG. 6 in sequence, data resulting from the process discovery is organized and formatted, then processed using NLP techniques, to be translated to human-readable language. The human-readable language is stored at the AI manager server and made available to be displayed and/or rendered for a graphical user interface (GUI) of a client device.

Benefits of the NLP phases are that they bring forth a sequential procedure to input high-level steps and convert them into human-readable language that will optimize the current tasks performed by the tracking users. In the first phase, multiple instances of formatted content (in the form of high-level steps) are sent to the NLP engine to determine an aggregation of task descriptions. Next in the second phase, the task descriptions are provided to the NLP engine for efficient assessment of tasks. Based on the words and tokens provided in the task descriptions, the NLP engine can apply situational awareness on each task to determine best fit process being described, as well as the name of the process.

FIG. 7 presents a flowchart for applying feedback for the NLP engine, fine-tuning parameters of the NLP engine, and performing continuous optimization of the NLP engine. As illustrated in FIG. 7, method 700 describes the continuous improvement process with steps that can be performed in sequence, not limited to only the steps provided in this flowchart. Furthermore, one or more components of this specialized computing environment are configured to perform any steps involved in this method. In this specific embodiment, an external database server stores a set of process discovery descriptions of the NLP engine. The process discovery description specifies processes that each encapsulate a specific set of tasks used in the NLP phase. The specific set of tasks describe task information from one of multiple sample prompt files provided to the NLP engine. The sample prompt files enable configuration of the NLP engine and may eventually be changed, updated, and modified. At 710, a set of process discovery descriptions are processed from the database server. At 720, task information about one of the prompt files is received. At 730, descriptions and names are created based on the task information. In some of the embodiments, metrics are also calculated for the created descriptions and created names. At 740, a feedback system performs iterations over each of the processed discovery descriptions. A feedback system is further applied to improve performance of the NLP engine. In some embodiments, changes to tracking user activity can occur due to tracking users being designated to new or different roles, as well as tracking users being removed from the system. Finally, at 750, in response to applying the feedback system, parameters associated with the NLP engine are fine-tuned to execute NLP techniques in a more efficient manner.

In a continuous improvement process, feedback is obtained, parameters are fine-tuned for the NLP engine, and continuous optimization is performed on the server components. Such feedback promotes ongoing accuracy of the predictions by the NLP engine. A set of fine-tuned parameters improve the natural language processing. By fine-tuning the parameters, the system can respond to adjusted changes in tracking users and ensure that process information is brought forth with proper AI awareness of user activity.

Figure 8:
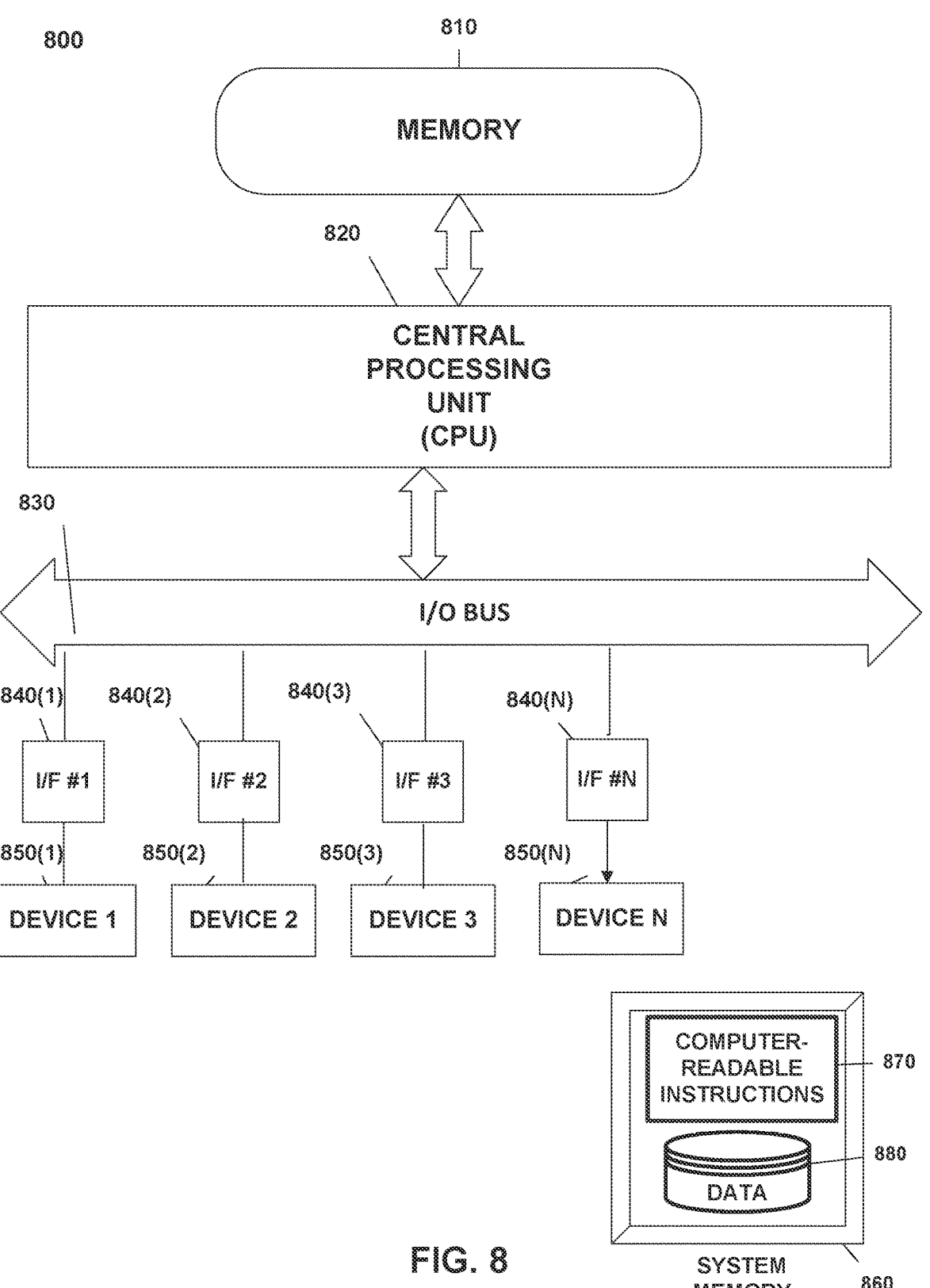
FIG. 8 presents an example hardware architecture for a client device and a server device for use in implementing at least some of the described technique in some embodiments.

FIG. 8 presents an example hardware architecture 800, which can represent either a client device or a server device. Generically, the hardware architecture 800 includes memory 810 in the form of tangible computer readable medium such as random access memory (RAM), read-only memory (ROM), programmable read-only memory (PROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM), magnetic disk or tape, optical disk, flash memory, holographic memory, or the like. The hardware architecture 800 further includes a central processing unit (CPU), microprocessor, or other type of processing logic. The hardware architecture also includes an input/output bus (I/O bus) 830.

The embodiments described herein are implemented by physical computer hardware, including computing devices, servers, receivers, transmitters, processors, memory, displays, and networks. The embodiments described herein provide useful physical machines and particularly configured computer hardware arrangements.

The exemplary method may be implemented in a computer program product that may be executed on a computer. The computer program product may comprise a non-transitory computer-readable recording medium on which a control program is recorded (stored), such as a disk, hard drive, or the like.

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer (s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device capable of implementing a finite state machine that is in turn capable of implementing the flowchart shown in FIG. 2 can be used to implement the method.

Figure 9:
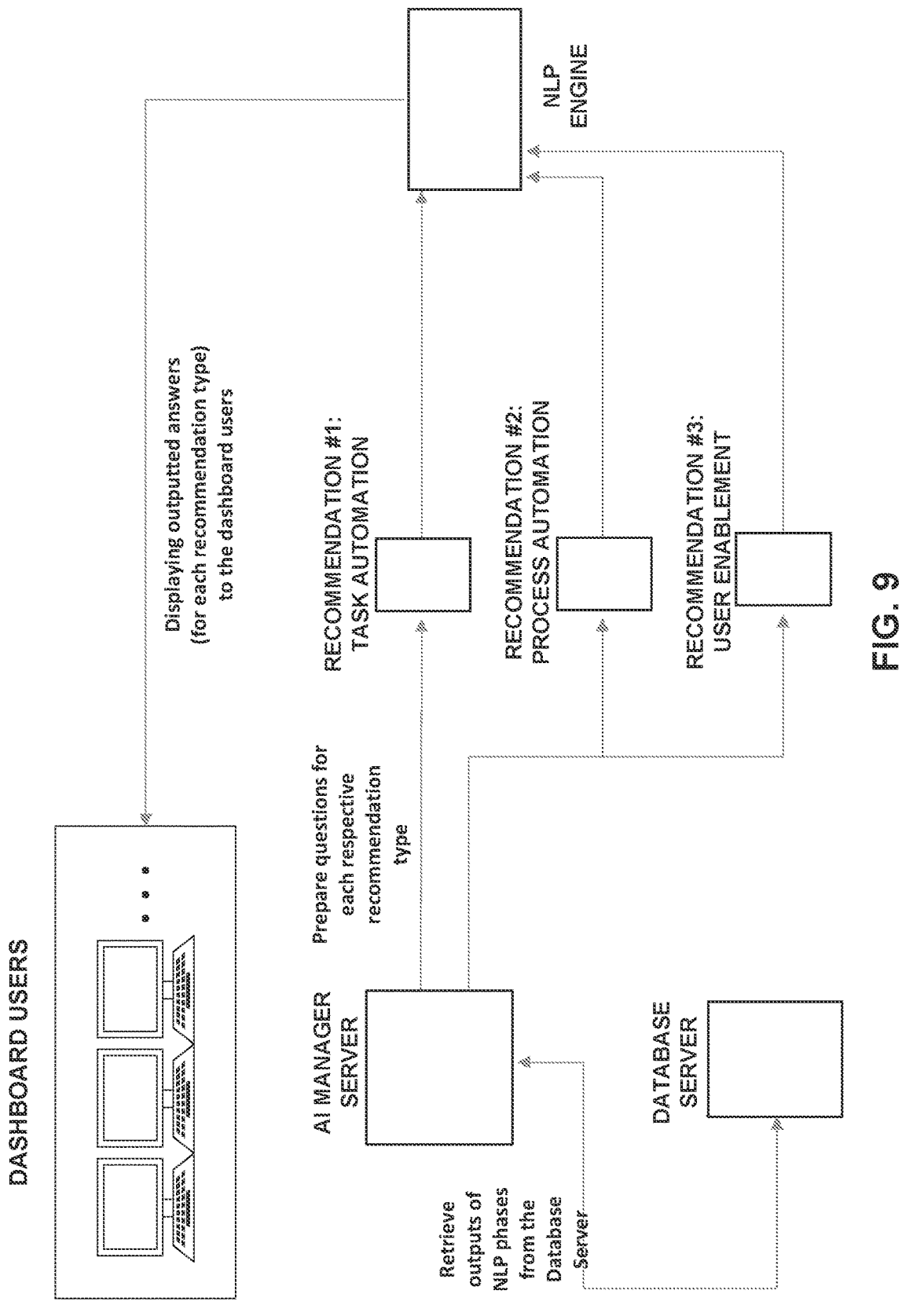
FIG. 9 presents an example of recommending a process improvement plan based on the identified process names and descriptions.

FIG. 9 presents an example for an automated process recommender that executes on one or more auxiliary computing devices to recommend a process improvement plan based on the identified process names and descriptions outputted from a most-recent NLP phase, as detailed in FIG. 6 at step 630. This example presents a means to access variations in the process descriptions and process names, and resultantly determine process improvements and create process recommendations. Furthermore, one or more components of this specialized computing environment are configured to perform any steps mentioned in the following example.

As detail for this example, presented herein is an automated process recommender for a scenario with a process that has multiple variations. The automated process recommender is an advanced automaton that provides response based on one or more language models, such as for language models that are trained over 1 billion documents. The advanced automaton executes on multiple servers of an auxiliary environment, each of them having specialized processors that power a process recommendation logic and constantly update the language models.

In a process description outputted from the NLP engine, the following information is presented about a tracking user: a request for new equipment requires an approval of expenses made by multiple tracking users. Expenses are entered into a web app and then combined (for the tracking users) to produce a total amount that is to be approved. A separate component external to the automated process recommender generates reports depicting a collection of productivity data of the tracking user. The expense data is validated against several data fields in order to ensure expense amounts have been entered correctly. Any discrepancies in the data will be corrected before they can be approved. It is useful to optimize this process and recommend steps that will reduce process variations."

Based on the process description above, the automated process recommender performs computations on the language and, as an output, recommends a plan including a series of steps. The following details are generated by the automated process recommender: "The first step is to define the process. This is done by clearly defining the process for requesting new equipment and obtaining approval for expenses. Such a defined process is required to include a detailed description of the steps involved, as well as the roles and responsibilities of each team member. The second step is to identify the variations. This is done by identifying the specific areas of the process that are causing the most variations. These areas could include issues with data entry, validation, or approval. The third step is to analyze the root cause. This is done by analyzing the root cause of the variations by conducting process mapping, interviews with team members, or other methods of data collection. By analyzing the root cause, this will help to determine the underlying issues that are causing the variations. The fourth step is to develop solutions. This is done by developing solutions to address the root causes of the variations. This could include implementing new training programs, creating new procedures or guidelines, or automating certain steps of the process. The fifth step is to implement the solutions. This is done by implementing the solutions that have been developed and monitoring the process to ensure that they are effective in reducing variations. The sixth step is to provide continual improvement. This is done by continually monitoring the process and make improvements as necessary. This could include conducting regular audits, tracking key performance indicators, or soliciting feedback from team members."

From the outlined plan in the previous paragraph, the goal is to reduce the variations of the process by clearly defining the process, identifying the variations, analyzing the root causes, developing solutions, implementing the solutions and continual improvement. Similarly, another goal is to automatically reduce the variations of the process in some manner.

In a further embodiment, the automated process recommender is further capable to speculate on the data entries and perform a thorough root cause analysis. This is an important step that causes generation of solutions. Based on the process description from the NLP engine, the automated process recommender identifies multiple data entries as a root cause. The automated process recommender analyzes details of the root cause, processes words of the root cause using specialized logic of the automaton, and outputs a solution to the root cause of multiple data entries, which may involve several different strategies, such as automation, standardization, validation, data governance, single source of truth, and monitoring. The following output is generated by the automated process recommender:

Automation is a strategy that entails implementing automation tools to reduce manual data entry, such as a web app that automatically imports and validates data from other sources.

Standardization is a strategy that entails establishing clear guidelines and procedures for data entry and providing training to team members on how to enter data correctly and consistently.

Validation is a strategy that entails enhancing the data validation process, for example, by adding more validation rules or using more advanced validation methods, such as using machine learning algorithms to check for errors.

Data governance is a strategy that entails implementing data governance policies to ensure that data is entered, stored, and managed in a consistent and controlled manner.

Determining a single source of truth is a strategy that entails implementing a single source of truth approach, where all data is entered into a central system and can be accessed and updated by authorized users.

Monitoring is a strategy that entails regularly monitoring data entry process, and identifying and addressing any issues that arise in a timely manner.

Of the strategies above, it is important to consider the specific resources and capabilities of the specialized computing environment when selecting which strategy to select and which solution to implement. It is also important to test the solutions before implementing them and monitor the impact of the solutions to apply adjustments as necessary.

In another further embodiment, the automated process recommender is further capable to account for a scenario where a tracking user has multiple errors in their task. For example, assume that tracking user 'John' commits a majority of the date entry errors for all the tracking users. The automated process recommender can identify a beneficial plan of action for John to standardize the process of the tracking user. Specifically, the automated process recommender could generate the following output information: "The best plan of action to standardize the process of John would be to apply measures for a future time interval. A first measure or course of action is to provide training for John on the proper procedures for data entry, including any specific guidelines or requirements for the process. This could include in-person training, online tutorials, or written documentation. A second measure is to provide John with examples of correctly entered data, so he can compare his own entries to the correct format. A third measure is to provide John with checklists or templates to help him ensure that he is entering the data correctly. A fourth measure is to provide John with supervision or mentoring during the data entry process, so that he can receive feedback and guidance on how to improve his performance. A fifth measure is to provide John with regular feedback on his data entry performance, including both positive feedback when he is doing well and constructive feedback when errors are made. A sixth measure is to provide John with incentives for meeting or exceeding data entry performance standards, such as bonuses or recognition. A seventh measure is to continuously monitor John's performance and provide him with additional training or support as needed. Furthermore, to ensure best practice, the automated process recommender is also important to communicate with John and understand why he is having trouble with data entry, it could be a lack of understanding of the process, lack of proper tools, or other factors that are causing the errors, and addressing those underlying issues will lead to a better standardization."

The illustrated steps are set out to explain the exemplary embodiments shown, and it should be anticipated that ongoing technological development will change the way functions are performed. These examples are presented herein for purposes of illustration, and not limitation. Further, the boundaries of the functional building blocks have been arbitrarily defined herein for the convenience of the description. Alternative boundaries may be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

The scope of the present disclosure includes any feature or combination of features disclosed herein (either explicitly or implicitly), or any generalization thereof, whether it mitigates any or all the problems addressed herein. Various advantages of the present disclosure have been described herein, but embodiments may provide some, all, or none of such advantages, or may provide other advantages.

In the foregoing detailed description, some features are grouped together in a single embodiment for streamlining the disclosure. This method of disclosure is not to be interpreted as reflecting an intention that the disclosed embodiments of the present disclosure must use more features than are expressly recited in each claim. Rather, as the following claims reflect, inventive subject matter lies in less than all features of a single disclosed embodiment. Thus, the following claims are hereby incorporated into the detailed description, with each claim standing on its own as a separate embodiment.

Although the embodiments have been described in detail, various changes, substitutions and alterations can be made herein. Moreover, the scope of the present application is not intended to be limited to the particular embodiments of the process, machine, manufacture, composition of matter, means, methods and steps described in the specification. As can be understood, the examples described above and illustrated are intended to be exemplary only. It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A computer-implemented method comprising:

monitoring, by one or more computing devices, event data generated during interactions of one or more users with one or more client devices;

analyzing, by the one or more computing devices, the event data to generate a summary of identified events in the event data that satisfy one or more defined criteria for event data;

generating, by the one or more computing devices and based on the summary of identified events, task information, workflow information, and a plurality of high-level steps performed for each of the identified events;

analyzing, by the one or more computing devices and using a natural language processing (NLP) engine, the plurality of high-level steps for each of the identified events, wherein the analyzing of the high-level steps generates one or more step descriptions and one or more step names;

analyzing, by the one or more computing devices and using the NLP engine, the one or more step descriptions and one or more step names to generate task descriptions and create task names related to the identified events, based at least in part on the step descriptions;

sending, by the one or more computing devices, the task descriptions to the NLP engine to summarize a process description and create a process name;

calculating, by the one or more computing devices and based on the event data, analytics results for at least one dashboard user, wherein the analytics results are displayed to the at least one dashboard user via use of a graphical user interface (GUI);

adding, by the one or more computing devices, the analytics results to a prompt file;

transmitting, by the one or more computing devices, the prompt file to an automated process recommender executing on one or more processors of one or more auxiliary computing devices;

processing, by the one or more auxiliary computing devices, the prompt file with the analytics results to generate a set of recommendations;

providing, by the one or more computing systems and responsive to generating the task descriptions and creating the task names, the created task descriptions, to enable improvement of the tasks related to the identified events; and outputting, by the one or more computing devices, the set of recommendations, wherein the set of recommendations describe process improvement data of the one or more users.

2. The computer-implemented method of claim 1 further comprising:

selecting a user of the one or more users after summarizing the process description and creating the process name; and generating a productivity report for the selected user, based on the summarized process description and the created process name.

3. A computer-implemented method comprising:

monitoring, by one or more computing devices, event data generated during interactions of one or more users with one or more client devices;

analyzing, by the one or more computing devices, the event data to generate a summary of identified events in the event data that satisfy one or more defined criteria for event data;

generating, by the one or more computing devices and based on the summary of identified events, task information, workflow information, and a plurality of high-level steps performed for each of the identified events;

analyzing, by the one or more computing devices and using the NLP engine, the plurality of high-level steps for each of the identified events, wherein the analyzed high-level steps generate one or more step descriptions and one or more step names;

analyzing, by the one or more computing devices and using the NLP engine, the one or more step descriptions and one or more step names to generate task descriptions and create task names related to the identified events, based at least in part on the step descriptions;

providing, by the one or more computing systems and responsive to generating the task descriptions and creating the task names, the created task descriptions, to enable improvement of the tasks related to the identified events;

receiving the generated task information;

creating process descriptions and process names based on the generated task information;

calculating metrics associated with the created process descriptions and process names;

processing a set of process discovery descriptions from an external database associated with the NLP engine;

performing iterations over each of the process discovery descriptions;

based on the performed iterations, applying a feedback system that improves performance of the NLP engine; and based on the applied feedback system, fine-tuning parameters associated with the NLP engine.

4. A non-transitory computer-readable medium having stored contents that cause one or more computing devices to perform automated operations, the automated operations including at least:

monitoring, by the one or more computing devices, event data generated during interactions of one or more users with one or more client devices;

analyzing, by the one or more computing devices, the event data to generate a summary of identified events in the event data that satisfy one or more defined criteria;

generating, by the one or more computing devices and based on the summary of identified events, task information, workflow information, and a plurality of high-level steps performed for each of the identified events;

analyzing, by the one or more computing devices and using a natural language processing (NLP) engine, the plurality of high-level steps for each of the identified events to generate one or more step descriptions and one or more step names;

analyzing, by the one or more computing devices and based at least in part on the step descriptions, and using the NLP engine, the one or more step descriptions and one or more step names to generate task descriptions and to create task names related to the identified events;

providing, by the one or more computing systems and responsive to generating the task descriptions and creating the task names, the created task descriptions, to enable improvement of the tasks related to the identified events;

receiving, by the one or more computing devices, additional task information in a sample prompt file;

creating, by the one or more computing devices, process descriptions and process names based on the additional task information;

calculating, by the one or more computing devices, metrics associated with the created process descriptions and process names;

processing, by the one or more computing devices, a set of process discovery descriptions from an external database associated with the NLP engine;

performing, by the one or more computing devices, iterations over each of the process discovery descriptions;

applying, by the one or more computing devices and based on the performed iterations, a feedback system that improves performance of the NLP engine; and fine-tuning, by the one or more computing devices and based on the applied feedback system, parameters associated with the NLP engine.

5. A system comprising:

one or more hardware processors of one or more computing devices; and one or more memories with stored instructions that, when executed by at least one of the one or more hardware processors, cause at least one computing device of the one or more computing devices to perform automated operations including at least:

monitoring event data generated during interactions of one or more users with one or more client devices;

analyzing the event data to generate a summary of identified events in the event data that satisfy one or more defined criteria;

generating, based on the summary of identified events, task information, workflow information, and a plurality of high-level steps performed for each of the identified events;

analyzing, using a natural language processing (NLP) engine, the plurality of high-level steps for each of the identified events to generate one or more step descriptions and one or more step names;

analyzing, based at least in part on the step descriptions and using the NLP engine, the one or more step descriptions and one or more step names to generate task descriptions and to create task names related to the identified events;

sending the task descriptions to the NLP engine to summarize a process description and create a process name;

calculating, based on the event data, analytics results for at least one dashboard user, wherein the analytics results are displayed to the at least one dashboard user via use of a graphical user interface (GUI);

adding the analytics results to a prompt file;

transmitting the prompt file to an automated process recommender executing on at least one auxiliary computing device of the one or more computing devices;

processing, by the automated process recommender, the prompt file with the analytics results to generate a set of recommendations;

providing, responsive to generating the task descriptions and creating the task names, the created task descriptions, to enable improvement of the tasks related to the identified events; and outputting the set of recommendations, wherein the set of recommendations describe process improvement data of the one or more users.

\* \* \* \* \*